United States Patent
Ehlgen et al.

(10) Patent No.: US 9,386,284 B2
(45) Date of Patent: Jul. 5, 2016

(54) ACTUATING DEVICE FOR A DEVICE FOR MONITORING THE VEHICLE SURROUNDINGS

(71) Applicants: Tobias Ehlgen, Ravensburg (DE); Florian Raisch, Gaertringen (DE)

(72) Inventors: Tobias Ehlgen, Ravensburg (DE); Florian Raisch, Gaertringen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 572 days.

(21) Appl. No.: 13/705,974

(22) Filed: Dec. 5, 2012

(65) Prior Publication Data

US 2013/0147956 A1   Jun. 13, 2013

(30) Foreign Application Priority Data

Dec. 9, 2011   (DE) .......................... 10 2011 088 139

(51) Int. Cl.
*H04N 7/18*   (2006.01)
*H04N 17/00*   (2006.01)

(52) U.S. Cl.
CPC ............. *H04N 7/188* (2013.01); *H04N 17/002* (2013.01); *B60R 2300/402* (2013.01); *B60R 2300/607* (2013.01)

(58) Field of Classification Search
CPC ............ B60S 1/0844; G01B 2210/143; H04N 17/002
USPC ......................................................... 348/148
See application file for complete search history.

(56) References Cited

U.S. PATENT DOCUMENTS

2005/0206511 A1* 9/2005 Heenan et al. ................ 340/438
2005/0237385 A1* 10/2005 Kosaka et al. .................. 348/42

FOREIGN PATENT DOCUMENTS

| CN | 101861255 A | 10/2010 |
|---|---|---|
| DE | 10 2006 056 180 | 4/2008 |
| DE | 10 2007 043 905 A1 | 5/2008 |
| EP | 2 179 892 | 4/2010 |
| EP | 2 189 340 | 5/2010 |
| EP | 2 210 776 | 7/2010 |

* cited by examiner

*Primary Examiner* — Hung Dang
*Assistant Examiner* — Girumsew Wendmagegn
(74) *Attorney, Agent, or Firm* — Norton Rose Fulbright US LLP

(57) ABSTRACT

An actuating device is provided for a device for monitoring the vehicle surroundings, which actuating device is functionally connected to the device for monitoring the vehicle surroundings. A calibration of the device for monitoring the vehicle surroundings is able to be initiated by means of the actuating device, the initiation of the calibration being correlated with a weather parameter detected by the actuating device.

13 Claims, 2 Drawing Sheets

ACTUATING DEVICE FOR A DEVICE FOR MONITORING THE VEHICLE SURROUNDINGS

BACKGROUND OF THE INVENTION

1. Field of the Invention

The present invention relates to an actuating device for a device for monitoring the vehicle surroundings, and also relates to a method for initiating a calibration of a device for monitoring the vehicle surroundings.

2. Description of Related Art

Systems for monitoring the vehicle surroundings which are equipped with cameras are already known in the automotive sector; due to the very low optical focal lengths, these cameras depict an environment of the motor vehicle from a bird's-eye perspective. One disadvantage of such plan view or bird's eye view systems is that slight displacements and consequently faulty calibrations of the cameras, or faulty calibrations among the cameras, can occur as a result of installation positions of the individual cameras.

For instance, said displacements can result from the fact that the cameras are in part installed directly in side mirrors of the motor vehicle; these side mirrors can be actively moved and are no longer able to reach the exact initial position when moved back. Because of the exposed installation positions, the lenses of the cameras can become heavily soiled during driving, which is why the cameras are partly protected from environmental effects by means of a protective mechanism. The mentioned faulty calibrations of the cameras may cause performance restrictions of calibration algorithms, e.g., in an object detection or a fusion of ultrasonic and camera images.

BRIEF SUMMARY OF THE INVENTION

Therefore, it is an object of the present invention to provide a device for a better calibration of a device for monitoring the vehicle surroundings.

This object is achieved by an actuating device for a device for monitoring the vehicle surroundings, which is distinguished by the fact that the actuating device is functionally linked to the device for monitoring the vehicle surroundings, and a calibration of the device for monitoring the vehicle surroundings is able to be initiated by means of the actuating device, the initiation of the calibration being correlatable with a weather parameter detected by the actuating device.

One advantage of the actuating device according to the present invention is that a calibration of the device for monitoring the vehicle surroundings is performed only if a weather parameter recorded by the actuating device allows it. This has the advantage that poor weather will not have an adverse effect on the calibration of the cameras of the device for monitoring the vehicle surroundings, so that an effective calibration of the cameras is able to be realized in this manner. As a result, calibration processes of the device for monitoring the vehicle surroundings are advantageously able to be implemented in a very efficient and time-saving manner.

One preferred specific embodiment of the actuating device according to the present invention is characterized by the fact that the actuating device is a first camera, which is situated in the vehicle interior and has a line of sight in the outward direction. Because of the weather-protected placement of the first camera, the first camera may be used to record and analyze a weather parameter based on objective criteria. This allows an excellent and objective evaluation of the currently prevailing weather situation, and the weather situation may be used to calibrate the device for monitoring the vehicle surroundings.

One advantageous further refinement of the actuating device is distinguished by the fact that the first camera is situated behind a vehicle windshield, which has an essentially orthogonal alignment with respect to a longitudinal axis of the vehicle. This makes it possible to record the visual conditions either in the forward or backward direction, which results in a better detection quality of the currently prevailing weather. Moreover, this system may also be used to detect structures in the environment that may be utilized for calibrating the first camera using the vehicle surroundings monitor.

One preferred specific embodiment of the actuating device is distinguished by the fact that the first camera is a multi-purpose camera. In this way a device which usually is permanently operated during regular driving operation of the motor vehicle is functionally linked to the device for monitoring the vehicle surroundings, so that it may advantageously be used to initiate a calibration of the device for monitoring the vehicle surroundings.

One preferred specific embodiment of the actuating device according to the present invention is distinguished by the fact that the first camera performs a calibration of the device for monitoring the vehicle surroundings when structures are detected. This advantageously makes it possible to use the first camera not only for initiating the calibration, but also for performing a calibration of the device for monitoring the vehicle surroundings.

One preferred specific embodiment of the actuating device according to the present invention is distinguished by the fact that the calibration preferably is carried out when the device for monitoring the vehicle surroundings is not in use. Because the calibration is implemented during non-use of the device for monitoring the vehicle surroundings, time is advantageously saved, so that the properly calibrated system is immediately available for each use.

In the following text, two figures are used to describe the present invention in detail together with additional advantages and features. Technical details of the device for monitoring the vehicle surroundings are not described in greater detail because they are not essential for the present invention. In this context, all of the described features or features illustrated in the figures, alone or in any combination, constitute the subject matter of the present invention, regardless of their combination in the patent claims or their antecedent references, and regardless of their wording and representation in the specification and in the drawing.

DETAILED DESCRIPTION OF THE INVENTION

Figure 1:
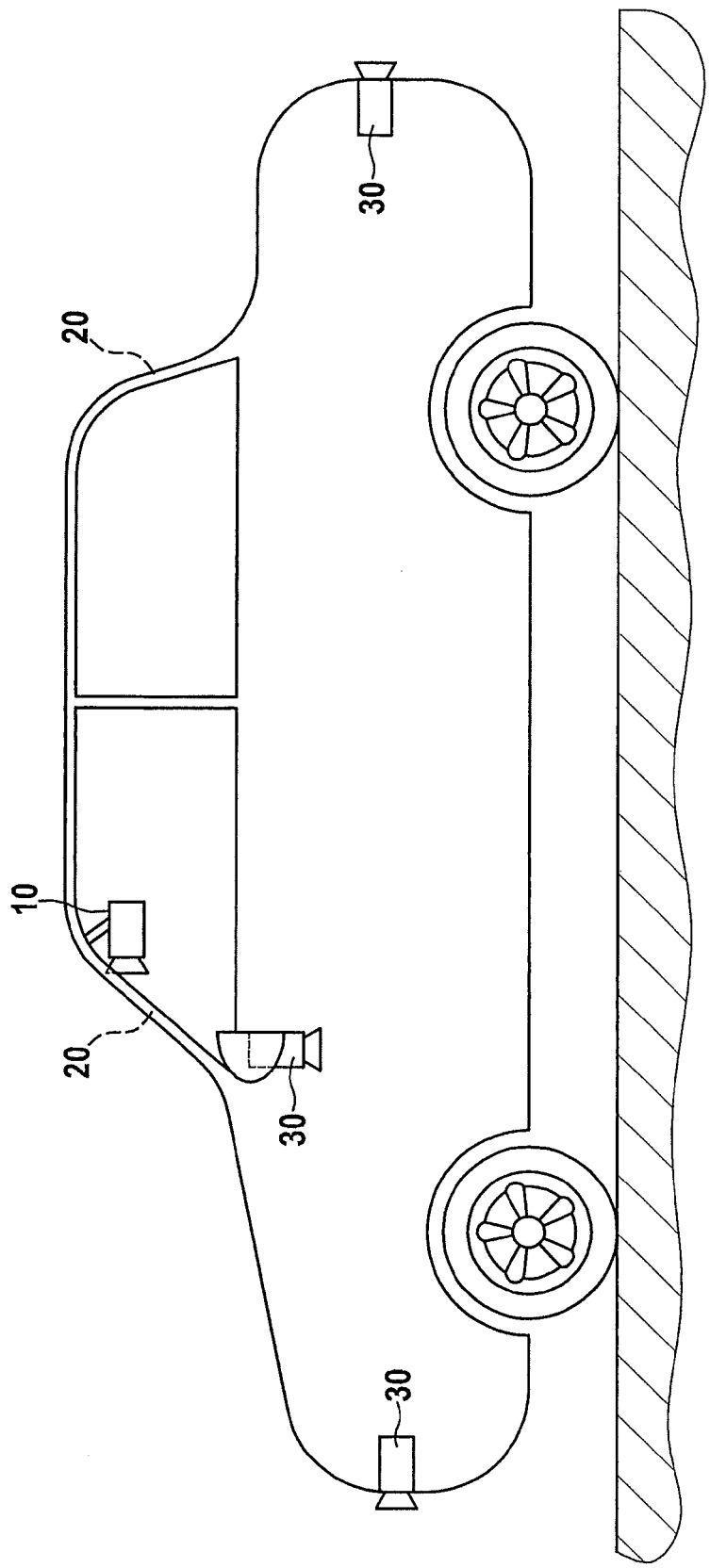
FIG. 1 shows a basic representation of a motor vehicle equipped with a specific embodiment of the actuating device according to the present invention.

FIG. 1 shows a basic side view of a motor vehicle equipped with a specific embodiment of the actuating device according to the present invention. Preferably, the actuating device is developed as a multi-purpose camera 10, which is situated, essentially rigidly, in a vehicle interior, behind a vehicle windshield 20, for instance on a rear-view mirror. It is also conceivable that first camera 10 is mounted behind a rear window (not shown) of the motor vehicle as an alternative. Moreover, it is likewise possible to place a first camera 10 both behind the windshield and behind the rear window, and that the most suitable first camera 10 is selected for initiating the calibration, or that both first cameras 10 are selected.

Using first camera 10, lane markings, traffic signs and/or prevailing visual conditions, for instance, are detected during rapid driving, the detected data usually being provided for further use/further processing in driver-assistance systems. A device for monitoring the vehicle surroundings actuated by first camera 10 via an actuating line 40 (not shown in FIG. 1) includes a plurality (preferably four) second cameras 30, one of which is situated, for example, in each side mirror of the motor vehicle, in a radiator grille and in a trunk lid of the motor vehicle. Second cameras 30 are aligned downwardly, at an angle of approximately 60° in relation to a horizontal plane, and provided with fish-eye lenses having very short focal lengths, i.e., visual angles of at least approximately 180°.

Second cameras 30 are able to be calibrated at regular intervals using conventional algorithms. The calibration, above all, includes a geometric alignment of the individual second cameras 30 or a geometric alignment of second cameras 30 with respect to each other. For mechanical protection or for protection against unfavorable external influences (such as precipitation, condensation, soiling etc.), second cameras 30 preferably are protected temporarily by means of mechanical protective devices (not shown). Such a protective device could be, for example, a vehicle brand emblem covering second cameras 30. Due to the fact that second cameras 30 situated in the side mirrors are not always returnable to their exact original positions for various reasons (e.g., because of movements of the side mirrors, improperly latched side mirrors, etc.), a geometric alignment of second cameras 30 with respect to each other may be affected over time.

According to the present invention, if first camera 10 records a weather parameter (e.g., sunshine, good visual conditions, no rain, dry roadway, many objects visible, etc.) indicating good weather, first camera 10, via actuation line 40, outputs an initiation signal for a calibration of second cameras 30 during running operation to second cameras 30. As first reaction to this initiation or actuation signal, a mechanical protective device (e.g., a protective cover) of second camera 30 first is retracted, whereupon second cameras 30 are calibrated using conventional means. Since first camera 10 is protected from the weather because it is situated in the vehicle interior behind an essentially always clean windshield, the prevailing weather conditions are able to be assessed in reliable manner. This assessment of the prevailing weather situation is to the benefit of second cameras 30 inasmuch as a calibration is initiated only if the weather conditions make it appear useful. Ineffective or partially effective calibration processes (e.g., caused by soiled lenses) of second cameras 30 are therefore excluded from the outset.

As another potential functionality of first camera 10, it is also conceivable that structures detected by first camera 10 (e.g., road markings, scenic features etc.) are used for aligning second cameras 30 according to their intended purpose or for aligning them with respect to each other in the intended manner. This aspect may be completely independent of the previously described initiation of the calibration, so that a calibration of second cameras 30 is also able to take place in a manner that is decoupled from a consideration of weather aspects.

Preferably, first camera 10 is able to set time intervals between the individual initiation or calibration processes. This may mean, for instance, that a calibration process or an attempted calibration process is initiated or executed approximately every two hours, for example, or whenever the side mirrors of the motor vehicle have exceeded a predefined movement frequency. The initiation of the calibration or the calibration advantageously takes place only when the device for monitoring the vehicle surroundings, in the form of second cameras 30, is not being used for its intended purpose (e.g., as parking aid when low curb clearances are encountered). As a result, the device for monitoring the vehicle surroundings in principle is advantageously available in properly calibrated condition whenever needed.

Due to the fact that first camera 10 essentially is mounted rigidly and usually is calibrated very well, it is possible to provide an excellent calibration reference for second cameras 30. According to the present invention, a well calibrated, essentially rigidly mounted multi-purpose camera is therefore employed for the alignment of position-sensitive second cameras 30. As a result, the system of second cameras 30 advantageously profits from an excellently aligned calibration reference in the form of first camera 10.

Figure 2:
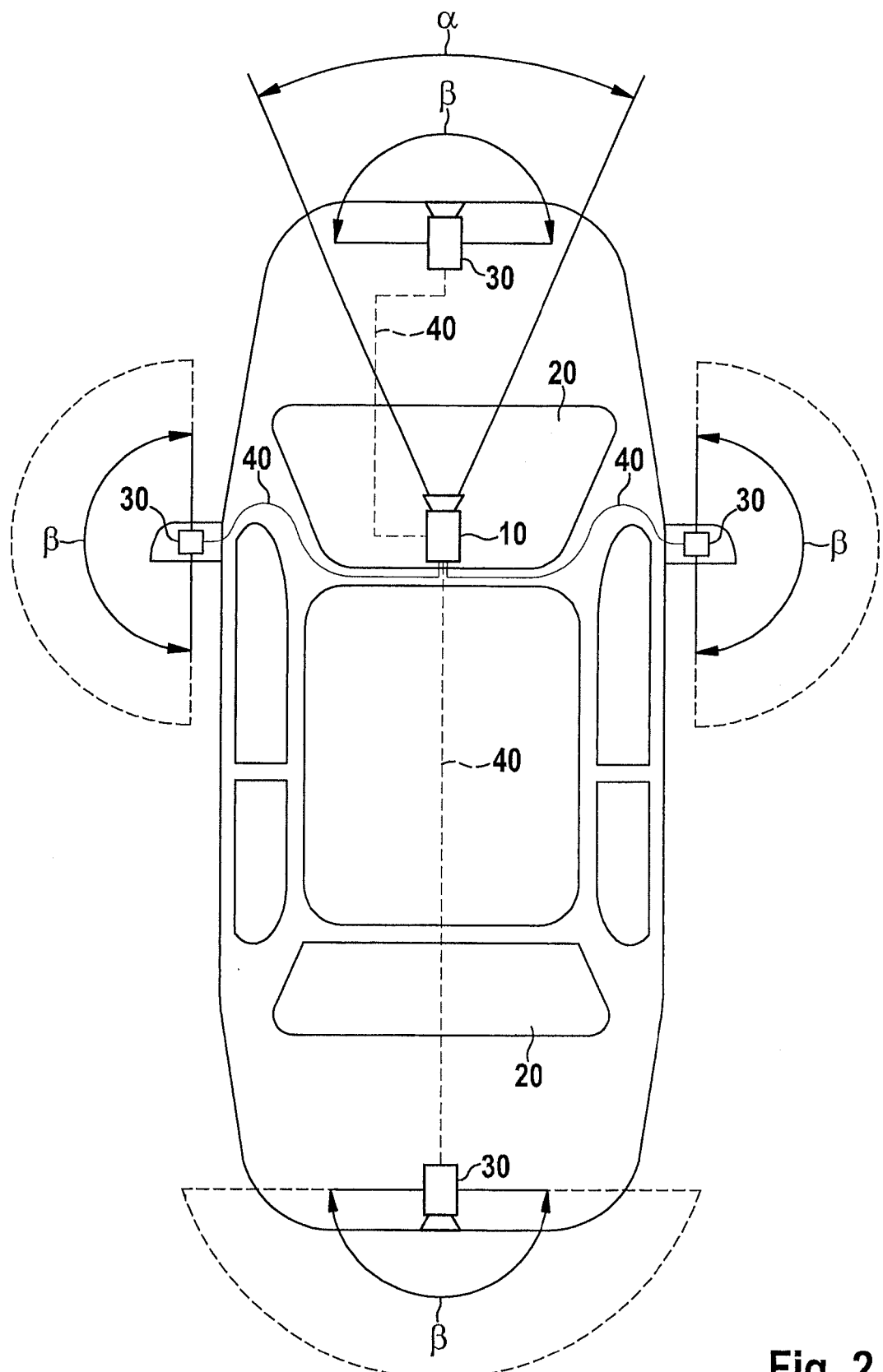
FIG. 2 shows another basic representation of a motor vehicle equipped with a specific embodiment of the actuating device according to the present invention.

FIG. 2, in a plan view, shows a basic representation of a motor vehicle equipped with a specific embodiment of the actuating device according to the present invention. It can be seen that first camera 10 has a lower visual angle α than each one of second cameras 30 featuring optical visual angles β. Due to large visual angles β of second cameras 30, it is therefore possible that structures of the environment are detected jointly by first camera 10 and second cameras 30. In this way the jointly detected structures may be used for calibrating second cameras 30 or for calibrating them with respect to each other and/or with respect to first camera 10.

In summary, the present invention provides an actuating device for a device for monitoring the vehicle surroundings, by which an initiation of a calibration or a calibration of the device for monitoring the vehicle surroundings is able to be carried out on the basis of an objectively recordable, technically meaningful criterion, so that the calibration processes may be carried out in a resource-sparing manner. Toward this end, a multi-purpose camera is functionally coupled to a system made up of bird's-eye view cameras, and an initiation of the calibration, or a calibration, of the bird's-eye-view cameras is carried out with the aid of the multi-purpose camera only if the external weather conditions make this appear meaningful. This advantageously reduces soiling of the lenses of the bird's-eye-view cameras, so that the bird's-eye-view cameras require less frequent cleaning, which advantageously prolongs the operativeness period.

Depending on the application case, an expert will modify and combine the described features of the present invention in suitable manner without departing from the core of the present invention.

What is claimed is:

1. An actuating device for a device for monitoring the surroundings of a vehicle, comprising:
   a detection device provided as the actuating device;
   wherein the actuating device: (i) detects a weather parameter; (ii) is functionally connected to the device for monitoring the vehicle surroundings; and (iii) initiates a calibration of the device for monitoring the vehicle surroundings, the initiation of the calibration being dependent on the weather parameter detected by the actuating device, and
   wherein the actuating device is a first camera which is situated in the vehicle interior and has an outwardly directed line of sight.

2. The actuating device as recited in claim 1, wherein the first camera is situated behind a vehicle windshield which is oriented essentially orthogonally to a longitudinal axis of the vehicle.

3. The actuating device as recited in claim 2, wherein the first camera is a multi-purpose camera.

4. The actuating device as recited in claim 1, wherein the first camera performs a calibration of the device for monitoring the vehicle surroundings when structures are detected.

5. The actuating device as recited in claim 1, wherein the calibration is performed when the device for monitoring the vehicle surroundings is not in use.

6. The actuating device as recited in claim 1, wherein the device for monitoring the vehicle surroundings includes at least one additional camera mounted on the outside of the vehicle.

7. The actuating device as recited in claim 6, wherein the at least one additional camera includes a plurality of additional cameras mounted on the outside of the vehicle.

8. A method for initiating, by an actuating device, a calibration of a device for monitoring the surroundings of a vehicle, the actuating device being connected to the device for monitoring the surroundings, the method comprising:
   detecting, by the actuating device, at least one weather parameter; and
   initiating, by the actuating device, the calibration of the device for monitoring the vehicle surroundings if the weather parameter allows an essentially normal functionality of the device for monitoring the vehicle surroundings, and
   wherein the actuating device is a first camera which is situated in the vehicle interior and has an outwardly directed line of sight.

9. The method as recited in claim 8, wherein features of the vehicle surroundings detected by the actuating device are used to calibrate the device for monitoring the vehicle surroundings.

10. The method as recited in claim 9, wherein a time interval between successive calibration processes is set.

11. The method as recited in claim 10, wherein the device for monitoring the vehicle surroundings has at least one camera, and wherein the time interval between successive calibration processes is set as a function of a movement frequency of the at least one camera of the device for monitoring the vehicle surroundings.

12. The method as recited in claim 8, wherein the device for monitoring the vehicle surroundings includes at least one additional camera mounted on the outside of the vehicle.

13. The method as recited in claim 12, wherein the at least one additional camera includes a plurality of additional cameras mounted on the outside of the vehicle.

\* \* \* \* \*